United States Patent [19]
Replogle

[11] Patent Number: 5,156,489
[45] Date of Patent: Oct. 20, 1992

[54] ADJUSTABLE FLUME

[75] Inventor: John A. Replogle, Tempe, Ariz.

[73] Assignee: The United States of America as represented by the Secretary of Agriculture, Washington, D.C.

[21] Appl. No.: 770,258

[22] Filed: Oct. 3, 1991

[51] Int. Cl.⁵ .............................. E02B 7/42; E02B 7/54
[52] U.S. Cl. .......................................... 405/91; 405/90; 405/101; 73/215
[58] Field of Search ................. 30405/87, 88, 89, 90, 30405/91, 100, 101, 102; 73/215

[56] References Cited

U.S. PATENT DOCUMENTS

| | | | |
|---|---|---|---|
| 829,172 | 8/1906 | Pokorny | 405/102 X |
| 1,611,090 | 12/1926 | Walton | 405/102 |
| 2,485,755 | 10/1949 | Loosli | 405/90 |
| 3,333,423 | 8/1967 | Cook | 405/100 |
| 4,195,519 | 4/1980 | Replogle et al. | 73/215 |
| 4,467,645 | 8/1984 | Murphee | 73/215 |
| 4,549,837 | 10/1985 | Hebert | 405/100 X |
| 4,753,550 | 6/1988 | Nylander et al. | 405/101 X |

Primary Examiner—Randolph A. Reese
Assistant Examiner—Arlen L. Olsen
Attorney, Agent, or Firm—M. Howard Silverstein; John D. Fado

[57] ABSTRACT

A fully portable flume for a canal or water channel comprising a horizontal sill across the width of said flume; means to raise or lower the sill while maintaining it in a horizontal position; a movable transverse wall connected at its upper edge to the sill's upstream edge, and, at its lower edge, to the channel's floor. Flow measuring means such as a stilling well may be operatively associated with the sill.

8 Claims, 3 Drawing Sheets

ADJUSTABLE FLUME

FIELD OF THE INVENTION

This invention relates to a system for measuring and controlling water flow rate in channelized, flowing bodies of water, such as irrigation canals and the like.

PRIOR ART

Flumes and weirs of various types have been employed for measuring and controlling water flow rate through irrigation channels or canals. A flume essentially is a small dam or a side wall contraction in a ditch which raises the upstream water level and thereby causes conditions suitable for flow measurement.

Fully portable flumes often are preferred for such purposes, due to factors such as flexibility, simplicity and cost effectiveness. U.S. Pat. No. 4,195,519 describes a fully portable flume that operates on the stilling well principle. Briefly, in a stilling well apparatus, a horizontal sill and entrance ramp connected thereto are disposed across a canal to provide a flow obstruction or flume; a small tube or sensing pipe extends rearward of the sill along the floor of the canal; pressure sensing holes around a segment of the tube permit water to pass to a stilling well disposed above the sill. A vertical ruler or gage measures the height of the sill, and the height of the well after water flow to the well is stabilized. The difference in the two heights is quickly converted to the discharge flow rate through the canal by reference to precomputed tables generated by laboratory calibration, or by use of established computer modeling techniques.

An alternative stilling well apparatus was developed after U.S. Pat. No. 4,195,519, for use with portable flow measuring systems similar to that described in the patent. This apparatus is described in Flow Measuring Flumes for Open Channel Systems, M. G. Bos, J. A. Replogle, and A. J. Clemens, John Wiley and Sons, NY, 1984 pp 148-196; Journal of Irrigation and Drainage Engineering, ASCE, 1987, vol. 113, no. 4, pp 584-594 article by J. A. Replogle, B. J. Fry, and A. J. Clemens. Briefly, the apparatus employs a fixed sill, and a transparent, calibrated, vertical, narrow tube disposed above the sill. The bottom of the tube is connected to the downstream end of the sensing pipe extending rearward of the sill along the floor of the canal, so that water is able to rise through the vertical tube.

SUMMARY OF THE INVENTION

The present invention is a flume for controlling water flow through a channel or canal, for measuring flow rate by means of prior art stilling well apparatus, and which may be fully portable. Broadly, the apparatus comprises (a) a horizontal sill across the width of the channel;

(b) means to raise and lower the sill, while maintaining it in a horizontal position;

(c) a movable transverse ramp or wall connected at its upper edge to the sill's upstream edge, and, at its lower edge, to the floor of the channel; wherein the wall provides greater restriction to liquid flow through the channel as the sill is raised, and less restriction to flow when the sill is lowered.

An object of the present invention is to provide control of the water restriction from nearly (and visibly) zero restriction, to just enough to gain measuring control of the flow.

Another object is to provide a restriction that provides as low as about one-half to one inch upstream ponding for a water channel up to 3 feet wide and having up to 2 feet of water in depth, whereas prior art fixed-sill flumes, Parshall Flumes, and Cutthroat Flumes require upstream ponding (restriction) of as much as 4 inches or more to function.

A further object is to provide a minimum restriction for more than one flow rate through the channel, whereas prior art systems can operate at minimum restriction at only one flow rate, usually the maximum flow rate.

Yet another object is to reduce problems associated with excessive ponding such as sediment transport. If sediments are in the canal flow that is to be measured, they move as both suspended and as bed-load materials. Prior art flow measuring systems may cause excessive ponding which in turn causes the bed load to stop and accumulate in the channel upstream of the measuring device. Also, suspended loads may settle out to aggravate the situation, and soon there may be a channel full of sediments. In the present invention, sediment problems may be avoided.

Still another object is to provide a fully portable flow measuring device that may be inserted into the water in a water channel, while in the fully-open mode, so as to cause little or no disruption of flow during initial placement of the device.

An even further object is to provide an easily vertically-movable sill.

Yet a further object is to provide a flow measuring device that causes only about $\frac{1}{2}''$ to 1" rises in visible water surface for a measured flow rate of about 1 to 2 cubic feet per second, in comparison to prior art systems that cause about 3" to 12" rise of water for the same flow rates.

Still a further object is to provide a flow regulation and measuring system with increased accuracy (prior art systems frequently exceed 20% error in measurement accuracy).

Another object is to provide a fully portable flow measuring flume. As used herein "fully portable" means a device that is capable of being readily installed into lined or unlined flowing field channels by one or two people.

Still another object is to provide a flume that avoids the danger of overflowing the field channel upstream of the system.

Furthermore, an object is to provide a system that increases the upper flow limit for fully portable units to up to three times the previous flow limits. Due to physical size and weight, prior art fully portable units usually were limited to about 2 cfs for undefined earthen channels. While special weirs and the device of U.S. Pat. No. 4,195,519 were able to handle up to 18 cfs, this was not a fully portable embodiment but rather pertained to concrete-lined canals of a particular size, that essentially provided part of the components for flow measuring structure. For earthen channels, it is necessary to provide a greater number of components, in portable form, whereby weight quickly becomes a problem. The present invention has a wider flow measuring range than previous devices of the same weight, can be configured for about 6 cfs, and yet still be handled by 1 or 2 persons.

Yet further, an object of the present invention is to incorporate the accuracy features of long-throated flumes into a verticle movable gate system, that is practical to operate at minimum head loss through the device.

Still further, an object is to provide a measuring structure that can serve as both a portable check-dam in a canal, and as an accurate flow measuring device. (Most irrigation practice is such that flow control is accomplished by some kind of valve, or shutoff regulating gate; and flow measurement then is done with a separate structure, usually downstream.)

Even further, an object is to provide accurate flow measurement together with effective flow discharge and flow level control.

Yet further, an object is to provide flow measurement without significantly disturbing the flow.

Yet another object is to provide a system that is capable of removing most of the restriction to flow by quickly lowering the sill.

Still another object is to provide a portable unit that easily is levelled within a water channel.

Other objects and advantages will be obvious from the following more detailed description of the invention, taken in conjunction with the drawings, in which FIG. 1 is a cut-away perspective view of the basic components of the present invention.

FIGS. 2a-c are schematic side views of preferred embodiments.

DETAILED DESCRIPTION

Figure 1:
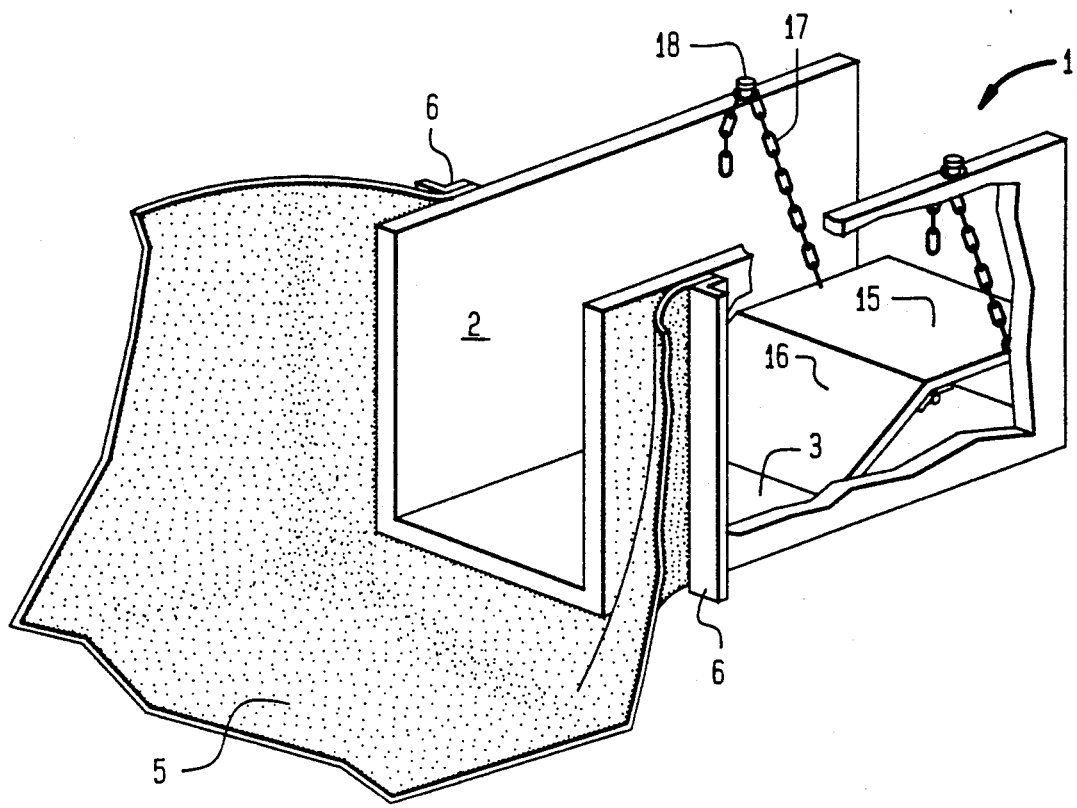

Referring first to FIG. 1, the flume unit of the present invention comprises a portable trough 1 having side walls 2 and bottom wall or floor 3. An impermeable membrane 5 may be secured or sealed to walls 2 and 3, by means of bolted angle strips 6 or other sealing or clamping means.

In operation the trough is placed in a water-carrying channel, with membrane 5 directed upstream, thereby forcing the channel water to flow therethrough.

Disposed within trough 1, near the downstream end, is a sill 15. The upstream edge of the sill pivotally is secured, as by means, for example, of strip (piano) hinges, to the upper end of an upstream wall or ramp 16 that, in turn, is pivotally secured at its lower end to the floor of the trough, by means of a similar hinge. The sill is held in place by means of chains 17 that may be hooked to catches 18 at the top of side walls 2.

It can be seen that the raising of the sill (while it is maintained in a horizontal position) causes wall 16 to become more erect as to provide a greater restriction to flow through the trough.

Figure 2A:
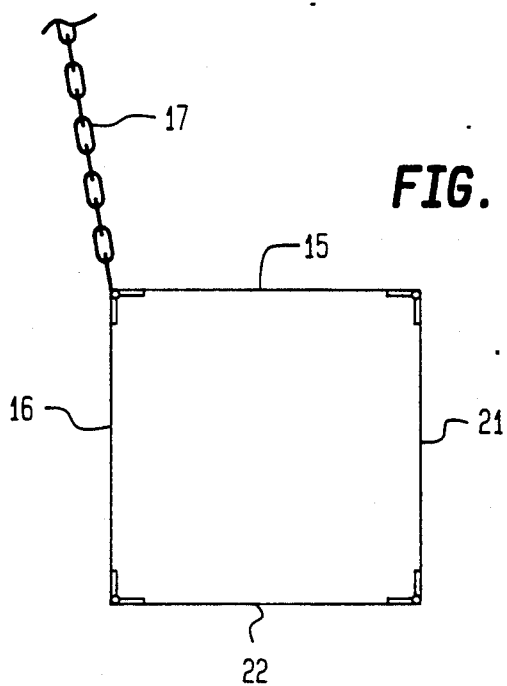
Figure 2B:
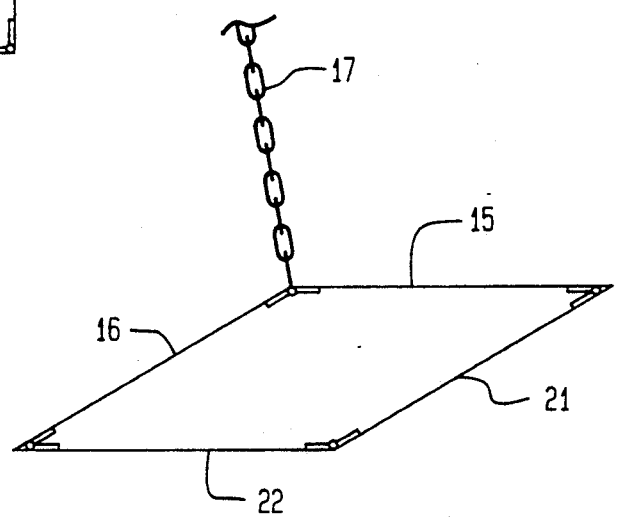
Figure 2C:
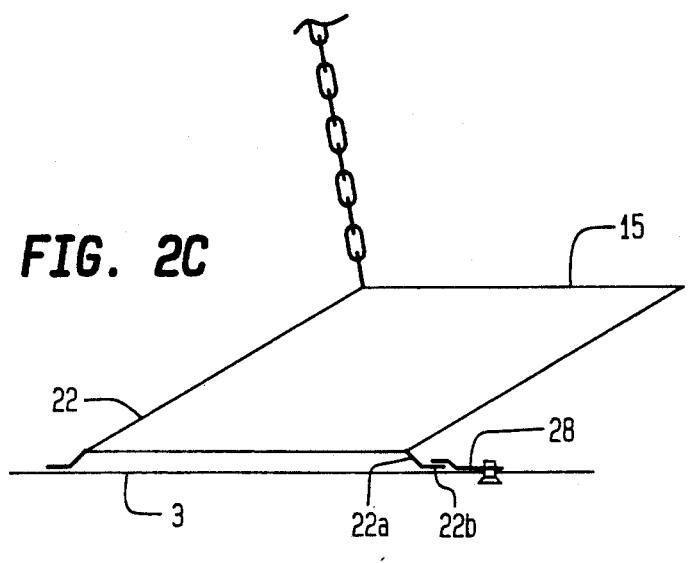

Referring to FIGS. 2a and 2b, to help maintain sill 15 in a horizontal position as it is raised or lowered, the downstream edge thereof may be pivotally secured to the upper edge of a downstream wall 21 that in turn is pivotally secured at its lower edge to a base member 22, as is wall 16. Walls 16 and 21 are parallel to one another so that sill 15, walls 16 and 21, and base member 22 define a parallelogram. As shown in FIG. 2c, base 22 may be provided with a pair of transverse legs 22a and feet 22b to stand upon floor 3 of trough 1. One of the transverse feet 22b may be held in place on the floor by means of a transverse strip 28 screwed to floor 3, and overlaying foot 22b.

As an alternative to the planar ramp or wall 16, the top edge of an accordion-like, impermeable membrane may be attached to the upstream edge of sill 15. The bottom edge of the membrane may be secured inside a recessed opening in the floor of trough 1 so that the sill may be lowered to the bottom of the floor, in order to provide minimum resistance to flow during its fully-open mode.

Rather than employing downstream wall 21 to help maintain sill 15 in a horizontal position during vertical movement, struts (not shown) may be attached to the downstream edge of the sill and floor 3.

Figure 3:
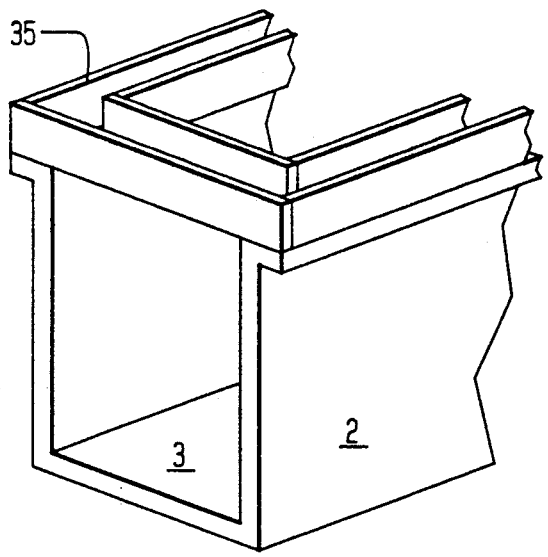
FIG. 3 is a perspective partial view of a preferred leveling device.

As shown in FIG. 3, in order to assure that trough 1 is level within the water channel, it preferably includes open channel longitudinal members 35 along the top edges of walls 2, and similar members bridging the side walls. These members may be composed of standard structural channel bars. To level the unit, water is splashed into the open channels; and the position of the unit is manipulated until the water therein indicates that the unit is level. An optional leveling arrangement would be to temporarily attach an elongated water tray(s) to the upper part of the unit, in lieu of the open channel members.

Conventional water seals may be employed with membrane 5, sill 15 and wall 16 to minimize leakage, and maximize the accuracy of flow measurements. For example, rubber flap seals may be used to in combination with the hinges, and also may be attached to the sides of wall 16. Similar seals may be attached to the sides of the sill to reduce leakage to undetectable limits, i.e., $\frac{1}{2}$ to 1% of flow rate.

With or without seals, the combined crack width at the sill preferably should be less than about $\frac{1}{2}$% of the sill width. At this proportion, the leakage flow would be undetectable among the other errors contributing to overall accuracy errors of about plus or minus 2 to 3%. The trade-off is that seals on the sill edge somewhat decrease the sill flow area. The seal obstruction-area of the sill should not exceed 1% of the flow area, particularly at low flow rates.

Typical dimensions for a portable unit are as follows:
trough 1: 4-6 ft long, 1-2 ft high, 1-3 ft wide;
sill 15: 0.75-1.5 ft long, 1-3 ft wide;
wall 16: 1-1.5 ft long, 1-3 ft wide.

As a general rule the length of the sill should be about 2 to 20 times the depth of the liquid (water) above the sill.

Preferred materials for the portable units include sheet steel 20 gage (or heavier without framing), for 1-3 cfs, and aluminum and aluminum framing for larger fluid loads. Fiberglass construction also is suitable. Membrane 5 can be composed of butyl rubber sheeting, heavy cotton woven canvas, standard irrigation canvas, such as reinforced plastic tarp and so forth. Slight leakage is permissible but should be less than $\frac{1}{2}$ to 1% of flow rate.

The sidewalls and bottom of the flume trough may be formed from one piece of bent sheet metal (aluminum or galvanized iron). The trough may be bolted to a support framing, if structural analysis indicates that excessive deflection of the side wall will occur. In smaller size troughs of only 1 foot in depth, no support frame on the sides usually is necessary, although deflection resistance may be gained by metal angle bars that are used to clamp membrane 5 to the sidewalls and floor of the trough.

Membrane 5 preferably is attached near the center of the trough, rather than at the upstream edge because the membrane may tend to bulge inward, if attached too close to the upstream edge, and thereby obstruct flow into the flume. Alternatively, a stiff entrance attachment near the upstream edge of the trough may be employed to prevent such bulging.

For permanent installations, preferred materials of construction include fiberglass walls; stainless steel sill, ramp and hinges; or concrete walls and stainless or galvanized working parts. Commercially available leaf-gates may be suitable for a permanent installation ramp, including commercially available heavy duty winches and electric motors sometimes sold with such leaf-gates.

A conventional stilling well measurement system may be employed in combination, or operatively associated, with the sill. These devices operate on the theory of creating critical flow by forming a channel contraction. The contraction may be varied by a vertically movable sill. The theory of critical flow flumes is well known and is described in many texts. For example, see Flow Measuring and Regulating Flumes, Bos et al, NTIS Accession No. PB83-241679, National Technical Information Service, U.S. Department of Commerce, revised/republished as Flow Measuring Flumes for Open Channel Systems, John Wiley and Sons, 1984, p321, republished by the American Society of Agricultural Engineers, 1991. As an example, the specific equation developed for a stilling well for a 2-ft wide flume, by computing a series of still heights, from 0.2 ft. through 0.6 ft, is:

$$Q=(8.591-5.57S+4.2S^2)(h_1+0.0048)^{(1.68-0.233S+0.144S2)}$$

where Q is the discharge, in cubic feet per second; $h_1$ is the sill-referenced water-surface elevation at the upstream gage location, and S is the sill height above the approach floor section, expressed in feet.

Figure 4:
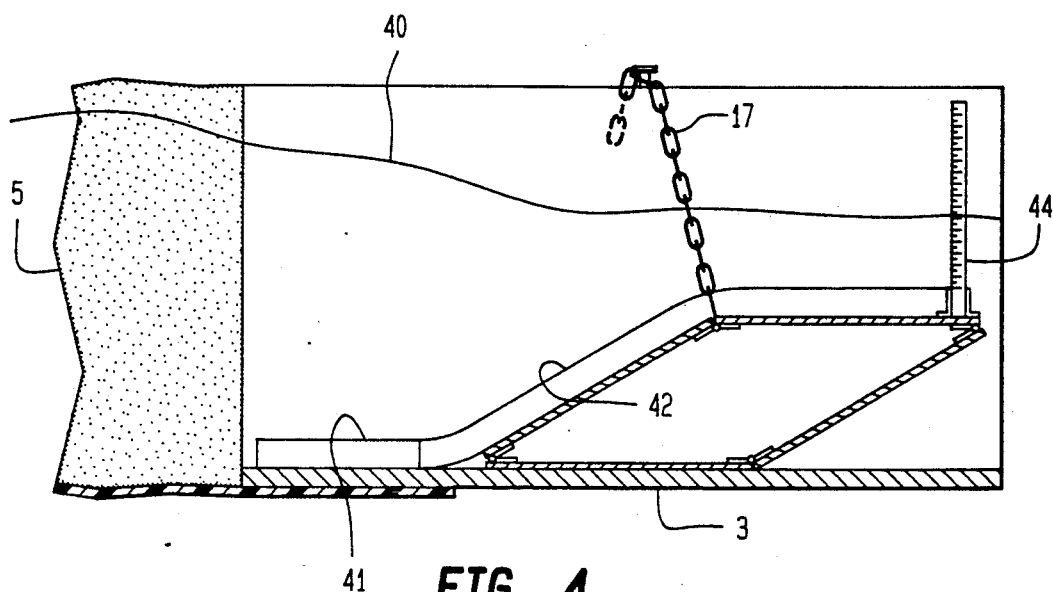
FIG. 4 is a side view of the invention including a stilling well flow measuring means.

Referring to FIG. 4, in the operation of the stilling well, water (its level is designated by reference numeral 40) enters the system through holes in narrow rigid tube or pipe 41 that extends rearward of the sill along floor 3, and may be held in place by means, for example, of a clip (not shown). Typically, the tube is about ½-¾ inch in diameter, about 12-18 inches in length, the holes are about 1/16 inch in diameter, and there are about 4-8 holes. The small quantity of water in tube 41 passes to flexible tubing 42 laying upon wall 16 and sill 15, and then to the bottom of transparent graduated tube 44, that is approximately ¾ inch in diameter. Tube 44 may be held in a vertical position by means, for example, of a tube holder attached to sill 15, or it may be suspended as shown in U.S. Pat. No. 4,195,519. Water rises in tube 44 to reflect the upstream water level. A convenient and quick measurement from this water level to the top of the sill, and on observation on the appropriate height of the sill, provides the information needed for the calibration equation or tables.

Rather than attaching the stilling well to the sill, it could be connected to the side of the flume (the historical method), but this is less preferred because of sensitivity to cross-slope levelling.

In some canal systems, the adjustable sill and ramp may be employed as a temporary shutoff gate, comparable to a "jackgate," by raising the sill to near or at its maximum height, whereby the stilling well apparatus need not be operative or present.

Figure 5:
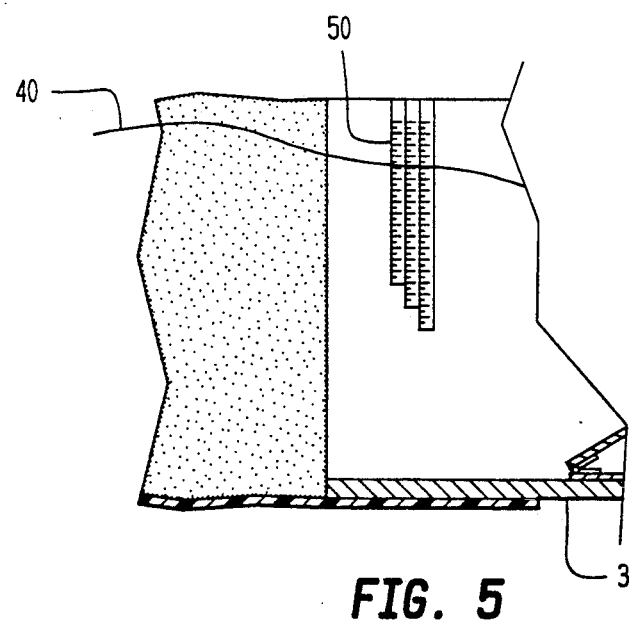
FIG. 5 is a side view of an alternative flow measuring means.

An optional system to the stilling well, but less accurate, is known in the prior art as staff gages or scales (FIG. 5, reference numeral 50), that are marked directly in flow rate, and connected to a trough side wall upstream of the sill. A separate scale is required for each sill height range of about 0.1 feet change in sill height. A plurality of chains are used to increment the sill to these fixed positions, and it is important that the flume be level.

I claim:
1. A flume for a liquid channel comprising:
   (a) a trough within said channel through which said liquid must flow in order to pass through said channel, said trough having a bottom wall and side walls;
   (b) an impermeable membrane connected to the upstream end of said trough to direct water in said channel to flow through said trough;
   (c) a movable horizontal sill across the width of said trough;
   (d) means to raise and lower said sill, while maintaining said sill in a horizontal position;
   (e) a movable wall connected at said wall's upper edge to said sill's upstream edge, and at said wall's lower edge to said trough's bottom wall; wherein said movable wall provides greater restriction to liquid flow through said trough as said sill is raised, and less restriction to flow when said sill is lowered.

2. The apparatus of claim 1 further including a stilling well connected to the downstream end of said sill; and wherein said flume is fully portable.

3. A flume for a liquid channel comprising:
   (a) a trough within said channel through which said liquid must flow in order to pass through said channel, said trough having a bottom wall and said walls;
   (b) first open channel structural support members connected along the top edge of each of said trough's side walls;
   (c) open channel lateral structural members bridging said first structural support members;
   (d) a movable horizontal sill across the width of said trough;
   (e) means to raise and lower said sill, while maintaining said sill in a horizontal position;
   (f) a movable wall connected at said wall's upper edge to said sill's upstream edge, and at said wall's lower edge, to said trough's bottom wall; wherein said movable wall provides greater restriction to liquid flow through said trough as said sill is raised, and less restriction to flow when said sill is lowered.

4. The apparatus of claim 3 further including a stilling well connected to the downstream end of said sill.

5. The apparatus of claim 4 wherein said movable wall comprises a ramp pivotally connected at said ramp's upper edge to said sill and at said ramp's lower edge to said bottom wall of said trough.

6. The apparatus of claim 5 further comprising an impermeable membrane connected to the upstream end of said trough to direct water in said channel to flow through said trough.

7. The apparatus of claim 3 wherein said movable wall comprises a ramp pivotally connected at its upper edge to said sill and at its lower edge to said floor.

8. The apparatus of claim 3 further comprising flow measuring means operatively associated with said sill.

* * * * *